(12) United States Patent
Bennett

(10) Patent No.: US 8,776,784 B2
(45) Date of Patent: Jul. 15, 2014

(54) SOLAR POWER DEVICE

(75) Inventor: Mark D. Bennett, Benld, IL (US)

(73) Assignee: The Boeing Company, Chicago, IL (US)

( * ) Notice: Subject to any disclaimer, the term of this patent is extended or adjusted under 35 U.S.C. 154(b) by 1398 days.

(21) Appl. No.: 12/163,703

(22) Filed: Jun. 27, 2008

(65) Prior Publication Data

US 2009/0320830 A1    Dec. 31, 2009

(51) Int. Cl.
*F24J 2/18* (2006.01)
*F24J 2/48* (2006.01)
*F24J 2/38* (2014.01)
*H02K 33/00* (2006.01)
*H02N 10/00* (2006.01)

(52) U.S. Cl.
USPC ........... 126/685; 126/617; 126/684; 126/704; 126/688; 126/698; 60/641.15; 60/641.8

(58) Field of Classification Search
USPC ......... 126/628, 680, 683, 684, 685, 688–691, 126/705, 708, 400, 698, 704, 617–620; 60/641.8, 641.11, 641.13, 641.14, 60/641.15, 517
See application file for complete search history.

(56) References Cited

U.S. PATENT DOCUMENTS

| | | | | |
|---|---|---|---|---|
| 588,177 A | * | 8/1897 | Reagan, Jr. | 136/206 |
| 1,302,363 A | * | 4/1919 | Graham | 122/26 |
| 1,993,213 A | * | 3/1935 | Gill | 126/615 |
| 3,320,408 A | * | 5/1967 | Mekjean | 219/530 |
| 3,364,676 A | * | 1/1968 | Miller | 60/641.15 |
| 3,949,554 A | * | 4/1976 | Noble et al. | 60/521 |
| 3,988,166 A | * | 10/1976 | Beam | 136/246 |
| 4,000,733 A | * | 1/1977 | Pauly | 126/680 |
| 4,068,474 A | * | 1/1978 | Dimitroff | 60/641.15 |
| 4,135,367 A | * | 1/1979 | Frosch et al. | 60/641.15 |
| 4,137,903 A | * | 2/1979 | Annett, II | 126/652 |
| 4,164,123 A | * | 8/1979 | Smith | 60/641.11 |
| 4,213,303 A | * | 7/1980 | Lane | 60/641.15 |
| 4,297,521 A | * | 10/1981 | Johnson | 136/248 |

(Continued)

FOREIGN PATENT DOCUMENTS

| | | | | |
|---|---|---|---|---|
| EP | 509286 A1 | * | 10/1992 | B01J 19/12 |
| JP | 57000456 A | * | 1/1982 | F24J 3/02 |

(Continued)

OTHER PUBLICATIONS

European Patent Office (International Searching Authority) International Search Report and Written Opinion dated Oct. 1, 2009, for Application No. PCT/US09/046454 filed Jun. 5, 2009.

(Continued)

*Primary Examiner* — Kang Hu
*Assistant Examiner* — Daniel E Namay
(74) *Attorney, Agent, or Firm* — Klintworth & Rozenblat IP LLC

(57) ABSTRACT

A concentrating solar power device may include a primary mirror, a secondary mirror, and a thermal storage device. The primary mirror may reflect solar rays from the sun towards the secondary mirror. The secondary mirror may reflect the solar rays reflected from the primary mirror towards the thermal storage device. The thermal storage device, which may comprise a thermal medium such as salt, may collect/absorb energy from the solar rays which may be used to run multiple Stirling engines, and/or an energy storing or energy expending device.

22 Claims, 4 Drawing Sheets

(56) References Cited

U.S. PATENT DOCUMENTS

| | | | |
|---|---|---|---|
| 4,372,291 A * | 2/1983 | Schwartz | 126/655 |
| 4,402,306 A * | 9/1983 | McElroy, Jr. | 126/619 |
| 4,452,047 A * | 6/1984 | Hunt et al. | 60/641.15 |
| 4,475,538 A * | 10/1984 | Percival et al. | 126/648 |
| 4,490,981 A * | 1/1985 | Meckler | 60/641.15 |
| 4,586,334 A * | 5/1986 | Nilsson et al. | 60/524 |
| 4,587,404 A * | 5/1986 | Smith | 392/346 |
| 4,619,244 A * | 10/1986 | Marks | 126/680 |
| 4,682,582 A * | 7/1987 | Zsida | 126/683 |
| 4,821,516 A * | 4/1989 | Isshiki | 60/517 |
| 4,841,946 A * | 6/1989 | Marks | 126/618 |
| 4,881,372 A * | 11/1989 | Naito | 60/521 |
| 4,947,825 A * | 8/1990 | Moriarty | 126/685 |
| 5,315,190 A | 5/1994 | Nasar | |
| 5,404,723 A * | 4/1995 | Parker et al. | 60/641.15 |
| 5,522,214 A | 6/1996 | Beckett et al. | |
| 5,642,618 A | 7/1997 | Penswick | |
| 5,647,217 A | 7/1997 | Penswick | |
| 5,654,596 A | 8/1997 | Nasar | |
| 5,687,706 A * | 11/1997 | Goswami et al. | 126/263.01 |
| 5,743,091 A | 4/1998 | Penswick | |
| 5,809,784 A * | 9/1998 | Kreuter | 60/650 |
| 5,895,033 A | 4/1999 | Ross et al. | |
| 5,918,463 A | 7/1999 | Penswick | |
| 5,920,133 A | 7/1999 | Penswick | |
| 5,931,158 A * | 8/1999 | Buck | 126/680 |
| 6,050,092 A | 4/2000 | Genstler et al. | |
| 6,094,912 A | 8/2000 | Williford | |
| 6,735,946 B1 * | 5/2004 | Otting et al. | 60/641.11 |
| 6,809,486 B2 | 10/2004 | Qiu et al. | |
| 6,818,818 B2 * | 11/2004 | Bareis | 136/246 |
| 6,930,414 B2 | 8/2005 | Qiu | |
| 6,931,848 B2 | 8/2005 | Maceda | |
| 6,933,629 B2 | 8/2005 | Qiu et al. | |
| 6,952,921 B2 | 10/2005 | Qiu | |
| 6,979,911 B2 * | 12/2005 | Otting et al. | 290/1 R |
| 7,084,518 B2 * | 8/2006 | Otting et al. | 290/1 R |
| 7,089,735 B1 | 8/2006 | Qiu | |
| 7,134,279 B2 | 11/2006 | White | |
| 7,137,251 B2 | 11/2006 | Qiu et al. | |
| 7,797,939 B2 * | 9/2010 | Green | 60/641.15 |
| 8,209,984 B2 * | 7/2012 | Penciu | 60/641.15 |
| 8,397,505 B2 * | 3/2013 | Penciu | 60/641.15 |
| 2002/0059798 A1 * | 5/2002 | Mehos et al. | 60/641.8 |
| 2008/0230111 A1 * | 9/2008 | Uehlin | 136/248 |
| 2009/0071154 A1 * | 3/2009 | Penciu | 60/641.15 |
| 2009/0134748 A1 * | 5/2009 | Penciu | 310/339 |
| 2009/0255253 A1 * | 10/2009 | Penciu | 60/641.15 |
| 2009/0320830 A1 * | 12/2009 | Bennett | 126/619 |
| 2010/0186820 A1 * | 7/2010 | Schon | 136/259 |
| 2012/0186251 A1 * | 7/2012 | Epstein et al. | 60/641.11 |

FOREIGN PATENT DOCUMENTS

| | | | | |
|---|---|---|---|---|
| JP | 59157440 A * | 9/1984 | | F24J 3/02 |
| JP | 62107278 A * | 5/1987 | | F03G 7/02 |
| JP | 01036952 A * | 2/1989 | | F02G 1/055 |
| JP | 01087861 A * | 3/1989 | | F02G 1/055 |
| JP | 04331486 A * | 11/1992 | | H02N 11/00 |
| JP | 06213514 A * | 8/1994 | | F24J 2/38 |
| RU | 2165029 C1 * | 4/2001 | | F02B 47/10 |
| WO | WO 79/01005 | 11/1979 | | |

OTHER PUBLICATIONS

SES Stirling Energy Systems (www.stirlingenergy/.com); SunCatcher; Solar Thermal; Technology 2008.
Infinia Corporation (www.infiniacorp.com).

* cited by examiner

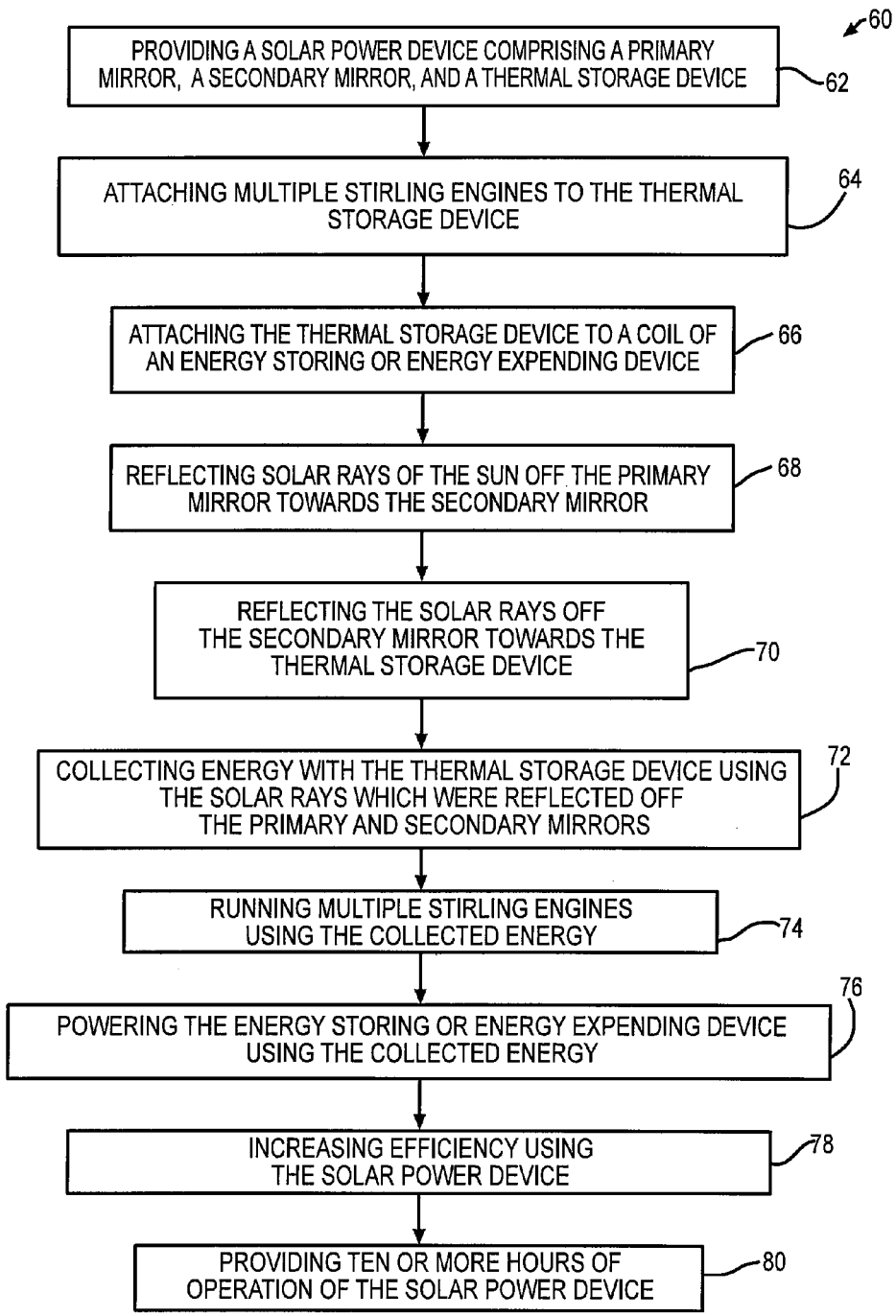

SOLAR POWER DEVICE

BACKGROUND

Many different types of solar power devices exist for collecting energy from the sun. One existing type of solar power device utilizes only one primary mirror which focuses solar rays from the sun onto a single Stirling engine. However, this type of solar power device may result in substantial refraction losses leading to only approximately twenty-eight percent efficiency. Another existing type of solar power device utilizes a parabolic trough that concentrates solar radiation onto a glass tube, which has a thermal transfer fluid pumped through it, and the solar power device collects the solar radiation into a salt thermal storage system. However, this type of solar power device may experience substantial heat transfer loss during the transfer of solar radiation into the thermal transfer fluid causing substantial decreases in efficiency.

A device and/or method is needed to decrease one or more problems associated with one or more of the existing devices and/or methods for collecting energy from solar rays of the sun.

SUMMARY

In one aspect of the disclosure, a concentrating solar power device may comprise: a thermal storage device for collecting energy from solar rays of a sun; a primary mirror; and a secondary mirror. The primary mirror may be for reflecting solar rays from the sun towards the secondary mirror. The secondary mirror may be for reflecting the solar rays towards the thermal storage device.

In another aspect of the disclosure, a method of collecting energy from solar rays of a sun may be provided. In one step, a solar power device may be provided comprising: a primary mirror, a secondary mirror, and a thermal storage device. In another step, the solar rays of the sun may be reflected off the primary mirror towards the secondary mirror. In still another step, the solar rays which may have been reflected from the primary mirror off the secondary mirror may be reflected towards the thermal storage device. In an additional step, the energy may be collected with the thermal storage device using the solar rays which may have been reflected off the secondary mirror towards the thermal storage device.

BRIEF DESCRIPTION OF THE DRAWINGS

FIG. 4 is a flowchart of one embodiment of a method of collecting energy from solar rays of the sun.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
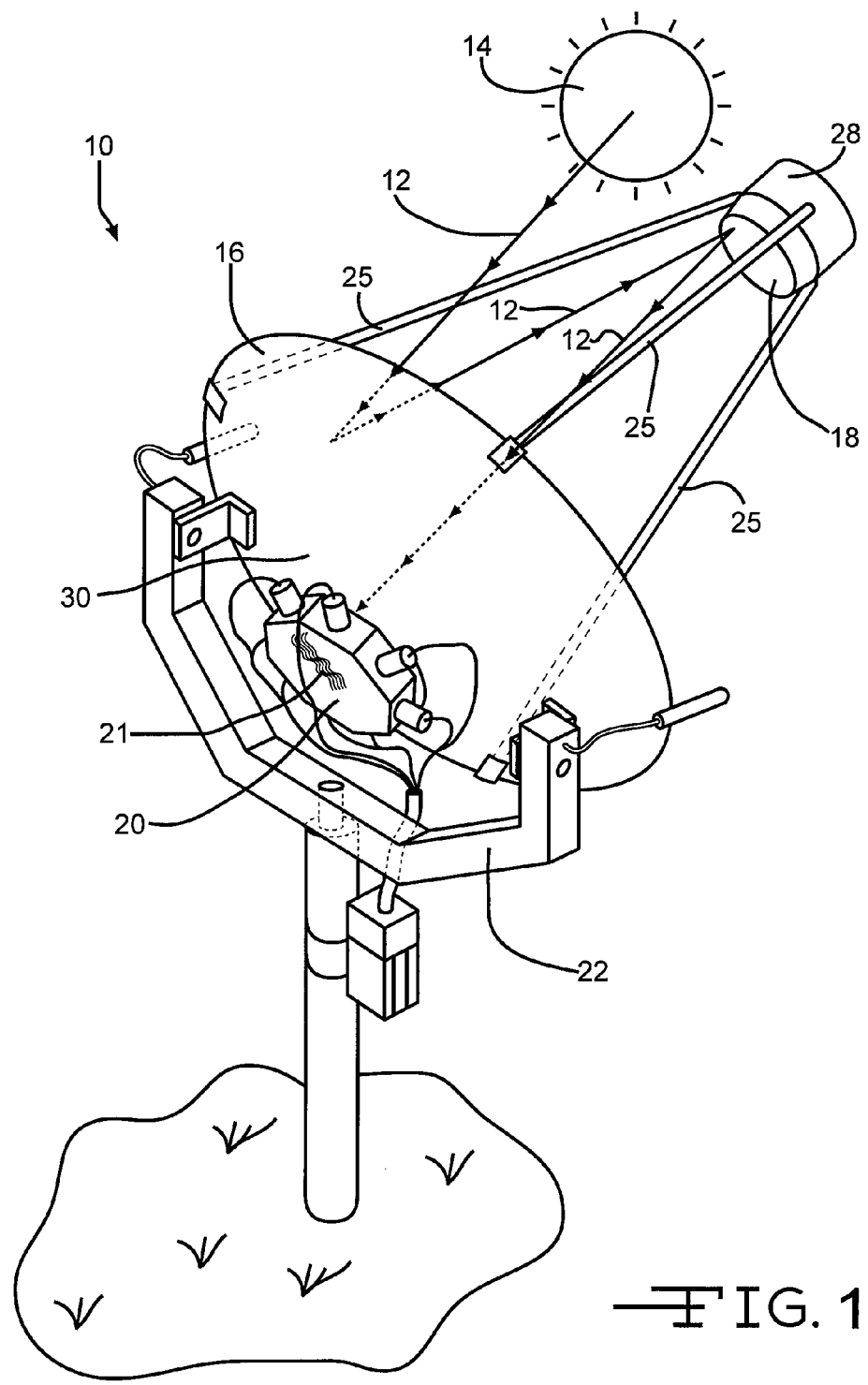
FIG. 1 shows a back perspective view of one embodiment of a concentrating solar power device for collecting solar rays from the sun.
Figure 2:
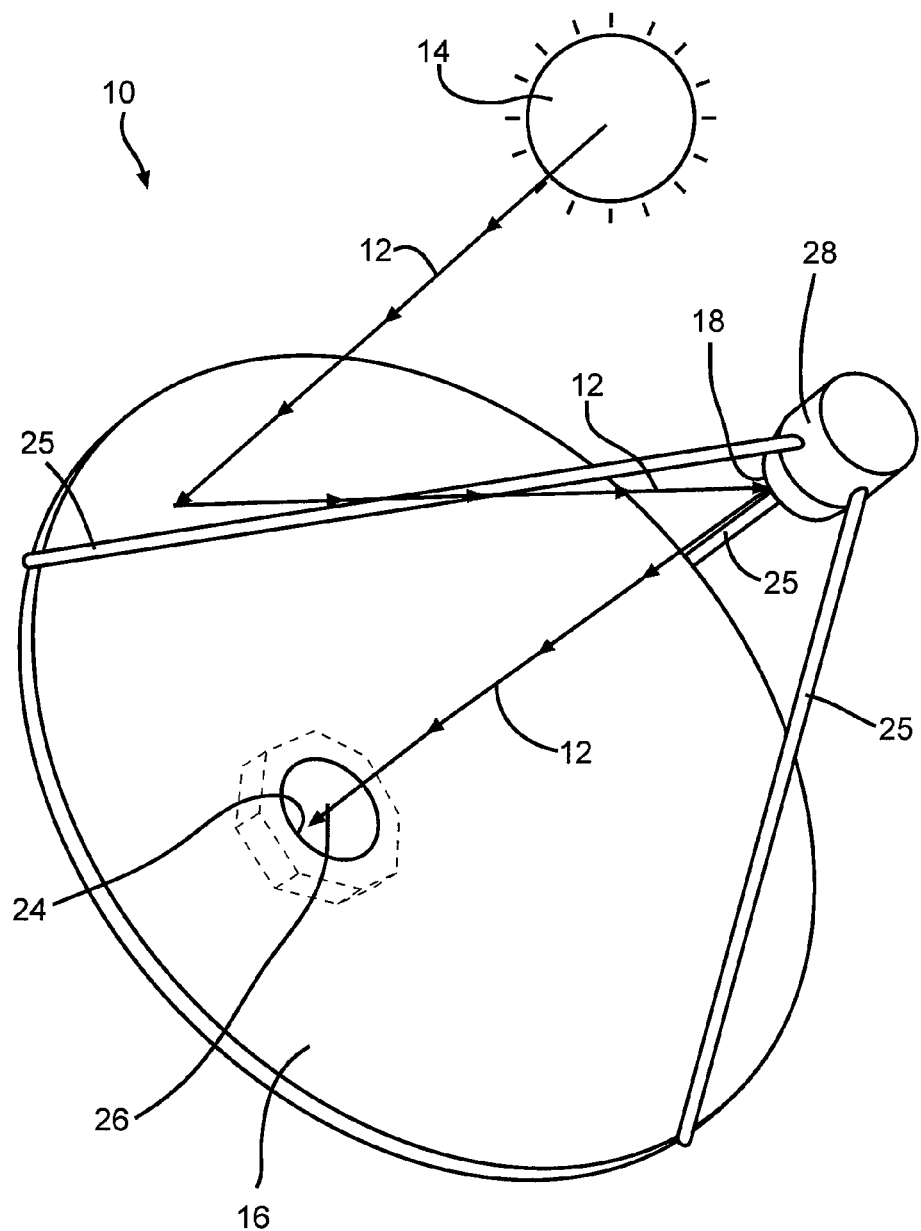
FIG. 2 shows a front perspective view of the concentrating solar power device of the embodiment of FIG. 1.

FIG. 1 shows a back perspective view of one embodiment of a concentrating solar power device 10 for collecting solar rays 12 from the sun 14. FIG. 2 shows a front perspective view of the concentrating solar power device 10 of the embodiment of FIG. 1. As shown in FIGS. 1 and 2, the concentrating solar power device 10 may include a primary mirror 16, a secondary mirror 18, a thermal storage device 20, and a rotating tracking frame 22.

The primary mirror 16 may be made of any type of reflective material, such as aluminum, a polymeric coating, and/or another type of reflective material. The primary mirror 16 may be concave in shape. In other embodiments, the primary mirror 16 may be in other shapes and/or sizes. The primary mirror 16 may be defined by an opening 24 in a center 26 of the primary mirror 16. The opening 24 may be six inches in diameter. In other embodiments, the location, size, and shape of the opening 24 may vary. The primary mirror 16 may be adapted to reflect solar rays 12 from the sun 14 towards the secondary mirror 18.

The secondary mirror 18 may be substantially smaller than the primary mirror 16 and may be aligned over and spaced apart from the opening 24 in the center of the primary mirror 16. Spacing members 25 may extend between the primary mirror 16 and a plate 28 to which the secondary mirror 18 may be attached. The secondary mirror 18 may be made of any type of reflective material, such as aluminum, a polymeric coating, and/or another type of reflective material. The secondary mirror 18 may be substantially flat in shape. In other embodiments, the secondary mirror 18 may be in other shapes, in other sizes, and/or in varying locations relative to the primary mirror 16. The secondary mirror 18 may be adapted to reflect solar rays 12, which may have been reflected towards the secondary mirror 18 by the primary mirror 16, towards the thermal storage device 20.

The thermal storage device 20 may be adapted to collect energy 21 from the solar rays 12 of the sun 14 which are reflected into the thermal storage device by the secondary mirror 18. The thermal storage device 20 may be attached to a back 30 of the primary mirror 16, and may be aligned with and behind the opening 24 in the center 26 of the primary mirror 16.

Figure 3:
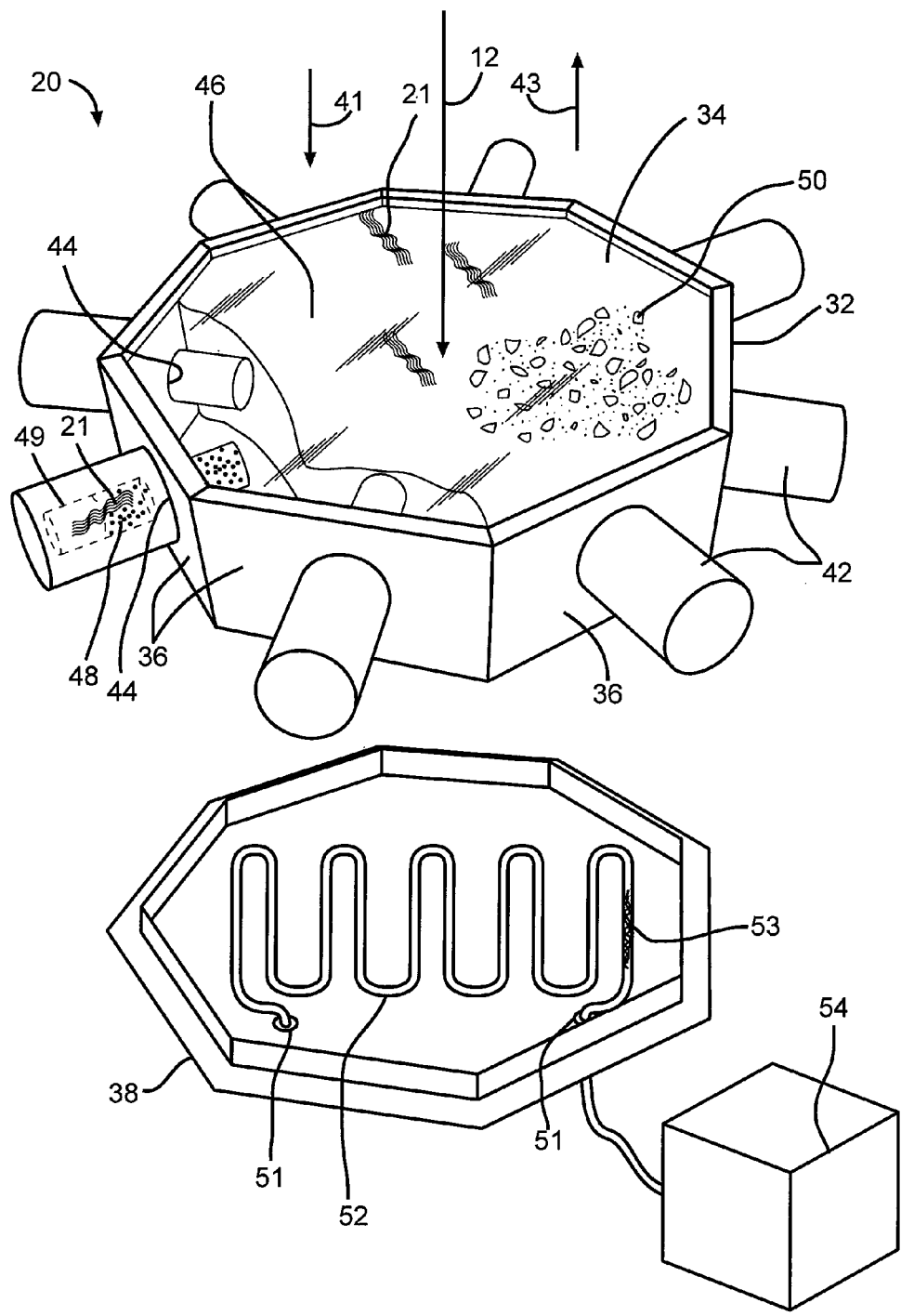
FIG. 3 shows a perspective view of a thermal storage device of the embodiment of FIG. 1 de-attached from the concentrating solar power device.

FIG. 3 shows a perspective view of the thermal storage device 20 of the embodiment of FIG. 1 de-attached from the concentrating solar power device 10. As shown, the thermal storage device 20 may comprise an insulated housing 32 having a top surface 34, side surfaces 36, a bottom surface 38, and an interior 46. To aide illustration, the bottom surface 38 is shown de-attached from the side surface 36. However, in use, the top surface 34, side surface 36, and bottom surface 38 are attached to one another to provide an insulated interior 46. The top surface 34 may comprise a glass lens which may be aligned directly behind the opening 24 in the center 26 of the primary mirror 16 as shown in FIGS. 1 and 2. The glass lens may be made of a low iron glass composition which may allow the solar rays 12 to travel in direction 41 but not in direction 43. In other embodiments, the glass lens may be made of varying materials. As shown in FIGS. 1-3, the secondary mirror 18 may be adapted to reflect solar rays 12, which may have been reflected towards the secondary mirror 18 by the primary mirror 16, towards the thermal storage device 20, through the opening 24 in the primary mirror 16, and into the interior 46 of the insulated housing 32 of the thermal storage device 20. As shown in FIG. 1, the rotating tracking frame 22, which may be attached to the primary mirror 16 and indirectly to the secondary mirror 18, may be adapted to track the sun 14 to continually locate the primary mirror 16 and the secondary mirror 18 into the best positions to reflect as many solar rays 12 as possible during the course of sun-light hours.

A thermal storage medium 50 may be disposed within and/or fill up the interior 46 of the insulated housing 32 between the attached top surface 34, side surfaces 36, and bottom surface 38. The thermal storage medium 50 may be adapted to collect/absorb energy 21 from the solar rays 12 of the sun 14 which are reflected into the interior 46 of insulated housing 32. The thermal storage medium 50 may comprise salt (potassium and sodium nitrates), graphite, carbon, molten carbonate, and/or silicone sand. In other embodiments, the thermal storage medium 50 may comprise any type of thermal storage absorption material which is adapted to collect/absorb energy 21 from the solar rays 12 of the sun 14 which are reflected into the interior 46 of the insulated housing 32.

A plurality of Sterling engines 42 may extend through holes 44 in the side surfaces 36 into the interior 46 of the insulated housing 32. Each Sterling engine 42 may comprise a thermal medium 48 disposed within a cylinder 49. The thermal medium 48 within the cylinder 49 may be adapted to be heated by a heat transfer from the thermal storage medium 50 as the thermal storage medium 50 collects/absorbs energy 21 from the solar rays 12 of the sun 14 in the interior 46 of the insulated housing 32. The thermal medium 48 may comprise hydrogen or helium. In other embodiments, the thermal medium 48 may comprise varying materials.

A coil 52 may extend through holes 51 in the bottom surface 38 into the interior 46 of the insulated housing 32. The coil 52 may be covered by the thermal storage medium 50 within the interior 46 of the insulated housing 32 between the attached top surface 34, side surfaces 36, and bottom surface 38 forming the interior 46 of the housing 32. The coil 52 may contain a substance 53 such as lithium bromide and water, and/or another type of substance. The coil 52 and the substance 53 within the coil 52 may be adapted to be heated by a heat transfer from the thermal storage medium 50 as the thermal storage medium 50 collects/absorbs energy 21 from the solar rays 12 of the sun 14 in the interior 46 of the insulated housing 32. The coil 52 may be made of stainless steel and/or made of other materials. The coil 52 may be attached to an energy storing or energy expending device 54 comprising at least one of an absorption refrigeration generator, a gas generator, a fuel-cell, an electrical device, a mechanical device, and/or another type of energy storing or energy expending device 54. As the coil 52 and the substance 53 within the coil 52 heat up, due to the heat transfer from the thermal storage medium 50, the energy 21 may be used to power the energy storing or energy expending device 54.

The concentrating solar power device 10 does not utilize any thermal transfer fluids, pumps, or valves. This may lead to increased efficiency over other existing solar power devices which may utilize fluids, pumps, or valves thereby leading to heat transfer losses. Moreover, the combination of the primary mirror 16, secondary mirror 18, thermal storage device 20, and multiple Stirling engines 42 of the concentrating solar power device 10 may lead to increased efficiency over other existing solar power devices which may utilize a single Stirling engine at a focal point of a primary mirror reflector as a result of the reduction of refraction losses. The concentrating solar power device 10 may allow for ten or more hours of operation. In another embodiment, the concentrating solar power device 10 may allow for ten to fourteen hours of operation. This may be a substantial improvement over one or more of the existing solar power devices which may only be able to operate for five to seven hours of operation.

FIG. 4 is a flowchart of one embodiment of a method 60 of collecting energy 21 from solar rays 12 of a sun 14. In one step 62, a solar power device 10 may be provided comprising a primary mirror 16, a secondary mirror 18, and a thermal storage device 20. The provided solar power device 10 may not comprise any thermal transfer fluids, pumps, or valves. The provided primary mirror 16 may be substantially larger than the provided secondary mirror 18. The secondary mirror 18 may be aligned with and spaced apart from a center 26 of the provided primary mirror 16. The provided thermal storage device 20 may be attached to the provided primary mirror 16. The provided solar power device 10 may be defined by an opening 24 in a center 26 of the primary mirror 16, and a glass lens of the provided thermal storage device 20 may be aligned behind the opening 24. The glass lens may be made of low iron glass or another type of material. The provided thermal storage device 20 may comprise a thermal storage medium 50 disposed within a housing 32. The thermal storage medium 50 may comprise at least one of salt (potassium and sodium nitrates), graphite, carbon, molten carbonate, silicone sand, and/or another type of thermal storage material.

In still another step 64, the provided thermal storage device 20 may be attached to multiple Stirling engines 42. Each Stirling engine 42 may comprise a thermal medium 48 comprising hydrogen, helium, or another material. In an additional step 66, the provided thermal storage device 20 may be attached to a coil 52 within the thermal storage device 20 for an energy storing or energy expending device 54 comprising at least one of an absorption refrigeration generator, a gas generator, a fuel-cell, an electrical device, a mechanical device, and/or another type of energy storing or energy expending device 54.

In another step 68, the solar rays 12 of the sun 14 may be reflected off the primary mirror 16 towards the secondary mirror 18. In still another step 70, the solar rays 12 which were reflected from the primary mirror 16 may be reflected off the secondary mirror 18 towards the thermal storage device 20. In an additional step 72, the energy 21 may be collected with the thermal storage device 20 using the solar rays 12 which were reflected off the secondary mirror 18 towards the thermal storage device 20. During step 72, the thermal storage medium 50 of the thermal storage device 20 may absorb the solar rays 12 and store the energy 21.

In step 74, multiple Stirling engines 42 may be run using the energy 21 collected by the thermal storage device 20. In step 76, the thermal storage device 20 may power, using the collected energy 21, the energy storing or energy expending device 54. In step 78, the provided solar power device 10 increases efficiency due to a lack of thermal transfer fluids, pumps, or valves, and/or due to a reduction in refraction losses. In still another step 80, the provided solar power device 10 may provide ten or more hours of operation.

One or more embodiments of the disclosure may improve efficiency over other existing solar power devices or methods of use which may utilize fluids, pumps, or valves thereby leading to heat transfer losses. One or more embodiments of the disclosure may lead to increased efficiency over other existing solar power devices or methods of use, which may utilize a single Stirling engine at a focal point of a primary mirror reflector, as a result of a reduction of refraction losses. One or more embodiments of the disclosure may allow for ten or more hours of operation which may be a substantial improvement over one or more of the existing solar power devices which may only be able to operate for five to seven hours of operation.

It should be understood, of course, that the foregoing relates to exemplary embodiments of the disclosure and that modifications may be made without departing from the spirit and scope of the disclosure as set forth in the following claims.

The invention claimed is:

1. A solar power device comprising:
   a lens;
   a thermal storage device comprising a housing with a single thermal storage medium in a solid state disposed within an interior cavity of the housing against the lens, the single thermal storage medium configured to collect and absorb energy from solar rays of a sun moving through the lens;
   a primary mirror;
   a secondary mirror, wherein the primary mirror is oriented to reflect the solar rays to the secondary mirror and the secondary mirror is oriented to reflect the solar rays through the lens to the single thermal storage medium which collects and absorbs the energy from the solar rays; and
   a plurality of separate Stirling engines, wherein the single thermal storage medium is disposed against and configured to power the plurality of separate Stirling engines.

2. The solar power device of claim 1 wherein the thermal storage device is attached to the primary mirror.

3. The solar power device of claim 1 wherein an opening is disposed in a center of the primary mirror, and the lens is aligned between the opening and the thermal storage device.

4. The solar power device of claim 3 wherein the lens comprises an iron glass composition.

5. The solar power device of claim 3 wherein the lens only allows the sun rays to travel through the lens into the thermal storage device and does not allow the sun rays to travel out of the thermal storage device through the lens.

6. The solar power device of claim 1 wherein the primary mirror is larger than the secondary mirror and the secondary mirror is aligned with and spaced apart from a center of the primary mirror.

7. The solar power device of claim 1 wherein the Stirling engines each comprise a thermal medium comprising Hydrogen or Helium.

8. The solar power device of claim 1 wherein the thermal storage device is connected to and powering an absorption refrigeration generator, a gas generator, a fuel-cell, an electrical device, or a mechanical device.

9. The solar power device of claim 1 wherein the solar power device does not utilize thermal transfer fluids, pumps, or valves.

10. The solar power device of claim 1 wherein the thermal storage device is disposed on an opposite side of the primary mirror as the secondary mirror.

11. The solar power device of claim 1 wherein the single thermal storage medium comprises salt (potassium and sodium nitrates), graphite, carbon, molten carbonate, or silicone sand.

12. A method of collecting energy from solar rays of a sun comprising:
   providing a solar power device comprising a lens, a primary mirror, a secondary mirror, a thermal storage device comprising a housing with a single thermal storage medium in a solid state disposed within an interior cavity of the housing against the lens, and a plurality of separate Stirling engines disposed against the single thermal storage medium;
   reflecting the solar rays of the sun off the primary mirror to the secondary mirror;
   reflecting the solar rays off the secondary mirror through the lens to the thermal storage device;
   collecting and absorbing energy from the solar rays with the single thermal storage medium; and
   powering the plurality of separate Stirling engines with the energy of the solar rays collected by the single thermal storage medium.

13. The method of claim 12 wherein the thermal storage device is attached to the primary mirror.

14. The method of claim 12 wherein an opening is disposed in a center of the primary mirror, and the lens is aligned between the opening and the thermal storage device.

15. The method of claim 14 wherein the lens comprises an iron glass composition.

16. The method of claim 14 wherein the lens only allows the sun rays to travel through the lens into the thermal storage device and does not allow the sun rays to travel out of the thermal storage device through the lens.

17. The method of claim 12 wherein the primary mirror is larger than the secondary mirror and the secondary mirror is aligned with and spaced apart from a center of the primary mirror.

18. The method of claim 12 wherein the Stirling engines each comprise a thermal medium comprising Hydrogen or Helium.

19. The method of claim 12 further comprising powering an absorption refrigeration generator, a gas generator, a fuel-cell, an electrical device, or a mechanical device with the energy of the solar rays collected by the single thermal storage medium.

20. The method of claim 12 wherein the solar power device does not comprise thermal transfer fluids, pumps, or valves.

21. The method of claim 12 wherein the thermal storage device is disposed on an opposite side of the primary mirror as the secondary mirror.

22. The method of claim 12 wherein the single thermal storage medium comprises salt (potassium and sodium nitrates), graphite, carbon, molten carbonate, or silicone sand.

* * * * *